April 7, 1959  C. A. COHEN  2,881,203
PROCESS FOR THE PREPARATION OF COMPLEX SYNTHETIC ESTERS
Filed April 30, 1957
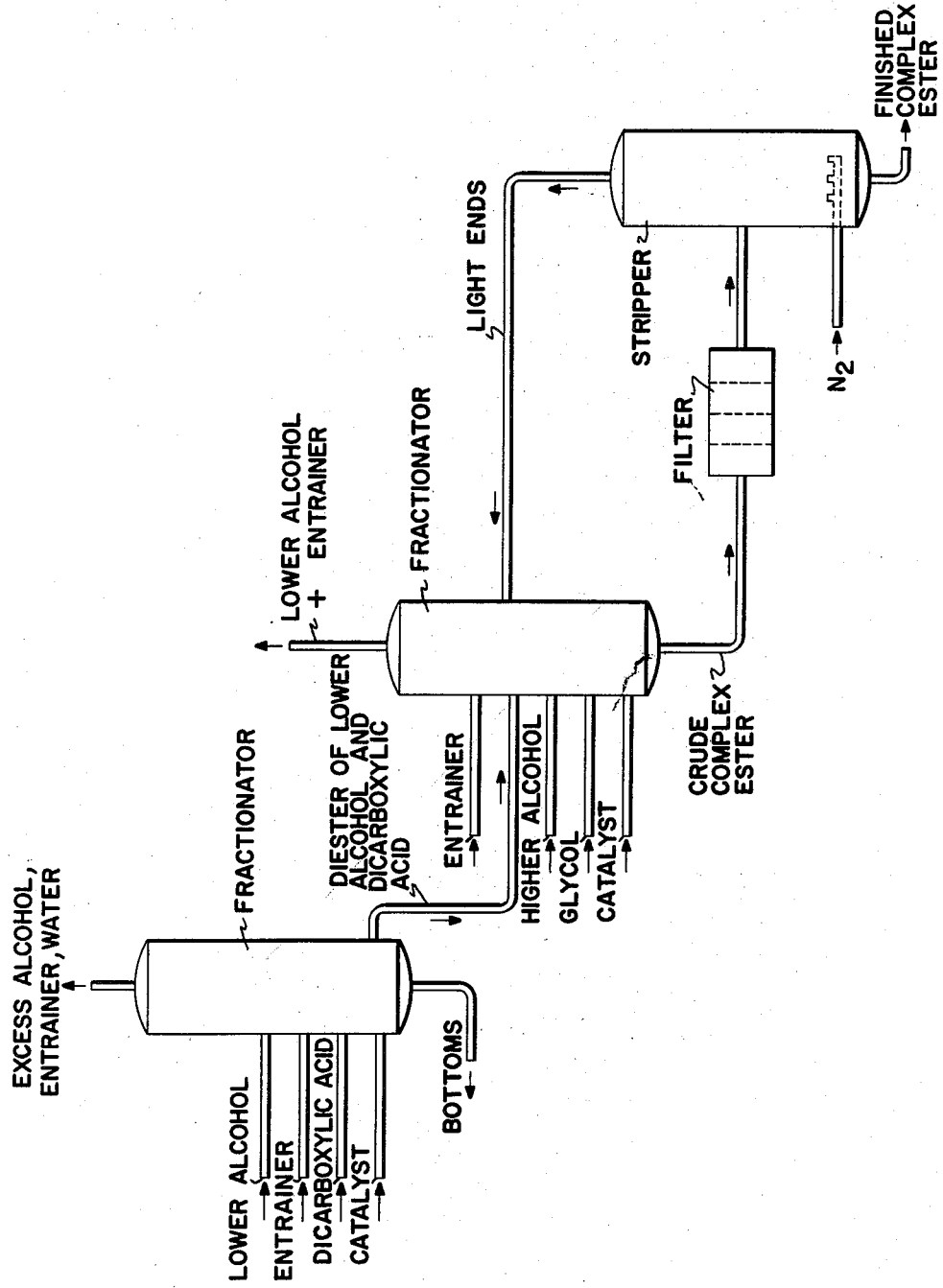
Charles A. Cohen  Inventor
By Frank T. Johnson  Attorney

United States Patent Office 2,881,203
Patented Apr. 7, 1959

2,881,203

PROCESS FOR THE PREPARATION OF COMPLEX SYNTHETIC ESTERS

Charles A. Cohen, Roselle Park, N.J., assignor to Esso Research and Engineering Company, a corporation of Delaware Application April 30, 1957, Serial No. 656,147

6 Claims. (Cl. 260—468)

This invention relates to synthetic esters and to a process for their preparation. Particularly, the invention relates to complex esters useful as lubricants and their preparation by simultaneous alcoholysis and esterification reactions between a diester, a glycol and an alcohol.

Complex ester synthetic lubricating oils prepared from various combinations of glycols, dicarboxylic acids and alcohols are well known in the art of synthetic lubricant manufacture. In general, these esters may be represented by the formula:

Alcohol-dicarboxylic acid-(glycol-dicarboxylic acid)$_n$-alcohol where $n$ is 1 or more. These esters have been previously prepared by a number of different methods.

One such prior method is by simultaneously reacting together in one step, the alcohol, glycol and dicarboxylic acid. Another method has been by forming the half ester of the dicarboxylic acid and alcohol, and then reacting this half ester with the glycol. Still another prior method has been by the reaction of a glycol with the diester. However, in each of these prior methods, relatively high temperatures under low vacuum is required in order to strip any unreacted materials or other byproducts such as diester that might have been formed in the reaction, from the complex ester. For example, in using the above methods it is usual to strip the complex esters at temperatures of about 400° F. under about 25 mm. of mercury pressure, for about 4 to 6 hours in order to obtain the desired complex ester product. Even in the case where oxygen-free nitrogen is bled into the system during the stripping operation, the subjection of these materials to high temperatures for so long a time results in a degraded product. This degradation results in the formation of color bodies and high acidities which must be removed by either washing with alkalis or by contacting or percolation with sorbent materials. It should also be noted that in the previously noted methods, that the acidity of the resulting ester is seldom reduced below a neutralization number of about 5.0 mg. KOH/gram of of esters. This necessitates treatment with aqueous alkali for removal of the acidity, with a frequent resulting loss of product due to bad emulsions which are usually formed during the washing procedure.

However, a new method of forming complex synthetic esters of the above type has now been found which eliminates subjecting the crude ester to high temperatures for long periods of time during its production. Also this new method yields in batch operation, material which closely duplicates inspections in batch after batch. Furthermore, this new process may be readily adapted to continuous complex ester manufacture.

In this new method for preparing lubricating esters, the need for high stripping temperatures over an extended period of time, is avoided by reacting a molar proportion of a diester prepared from a dicarboxylic acid and a low boiling point alcohol, with two molar proportions of a high boiling alcohol, in the presence of a glycol. In the reaction, a complex ester containing the residue of the high boiling alcohol is formed, along with a low boiling alcohol which is readily removed at low temperatures. Generally, an entraining agent will be used to assist in the removal of the low boiling alcohol. After the low boiling alcohol and the bulk of the entraining agent is removed by distillation, the complex esters may then be finished by filtering or water washing to remove the catalyst, and then stripped at a temperature of about 175° C. to 200° C. under about 1 to 10 mm. Hg, preferably with a nitrogen purge, to remove the final traces of the entraining agent and other light ends. This stripping operation is carried out by rapidly heating to 175°–200° C. under said vacuum, and once this temperature is reached, heating can be discontinued. In other words, the present process eliminates the prolonged heating (e.g. 4 to 6 hours) at about 200° C. as required by the prior methods to obtain a complex ester of the desired specification. As previously mentioned, the elimination of this prolonged stripping operation results in improved color and reduced acidity of the final product.

The complex ester formed by the method of the invention will have the general formula $$R_2\text{—OOCR}_2\text{COO—}(R_3\text{—OOCR}_4\text{COO})_x\text{—}R_5$$

wherein $R_1$ and $R_5$ are the alkyl radicals of a $C_5$ to $C_{12}$ alcohol, $R_2$ and $R_4$ are hydrocarbon radicals of a $C_4$ to $C_{12}$ dicarboxylic acid, $R_3$ contains 2 to 20, e.g. 2 to 12 carbon atoms and is the alkylene radical of a simple glycol or the oxyalkylene radical of a polyglycol, $x$ is a number of about 1 to 6, and the total number of carbon atoms in the molecule is about 20 to 150, e.g. 25 to 60.

The diesters used in forming the complex ester, are those diesters having the general formula:

$$R'OOC(R'')_x COOR'$$

wherein R' is an alkyl radical containing 1 to 3 carbon atoms and R'' may be an acyclic alkylene radical such as $(CH_2)_n$ where $n$ is 4 to 12; or an alicyclic alkylene radical such as cyclopentylene or cyclohexylene; or a dialkyl substituted aromatic such as xylenylene. Typical structures are illustrated below:

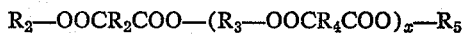

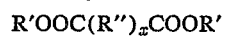

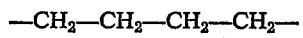

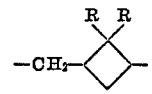

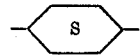

etc. Examples of such diesters include dimethyl sebacate, diethyl adipate, diisopropyl azelate, diethyl norcamphorate, diethyl pinate, diethyl phenylene diacetate, and alkyl substituted derivatives of the above such as diethyl methyl glutarate, diethyl methyl adipate and diethyl isosebacate, etc. It will be noted that the above dicarboxylic acids are free from non-aromatic unsaturation.

The high boiling alcohol which may be used is a $C_5$ to $C_{12}$ alkanol such as n-pentanol, n-hexanol, 2-ethyl hexanol, n-octanol, n-nonanol, n-dodecanol, etc. Also the highly-branched chain isomeric primary alkanols produced by the Oxo process may be used. For example, the $C_8$ Oxo alcohol, and $C_{10}$ Oxo alcohol. These Oxo alcohols are produced by the catalytic reaction of hydrogen, carbon monoxide and an olefin to form an aldehyde, which aldehyde is then hydrogenated to form the Oxo alcohol. Such Oxo alcohols and their preparation are well known in the art.

The glycol which may be used includes ethylene glycol and any of the paraffinic homologues of the same containing up to 20 carbon atoms. Examples of such glycols include saturated glycols such as: ethylene glycol, propylene glycol, butylene glycol, trimethylene glycol, tetramethylene glycol, etc. Also included under the term glycol, are polyglycols such as polyethylene glycols of the formula

wherein $n$ is 1 to 8 and polypropylene glycols of the formula

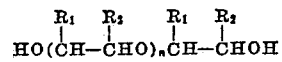

wherein either $R_1$ or $R_2$ is a methyl group and the other is hydrogen, and $n$ is 1 to 4.

The reaction is best carried out in the presence of a low boiling, inert hydrocarbon entraining agent such as heptane, benzene, toluol, etc. which will form a low boiling azeotrope with the liberated alcohol, thus permitting lower temperatures to remove the alcohol.

Preferably, the reaction is carried out in the presence of a transesterification or esterification catalyst such as alkaline catalysts, e.g. sodium methylate, metallic sodium, sodium-potassium alloy, anhydrous potassium carbonate, lime, zinc oxide, basic ion exchange resins, etc. The reaction will take place without a catalyst, however, the catalyst is preferred in order to obtain a faster reaction.

Reference is now made to the drawing, which represents a preferred embodiment for carrying out the process of the invention. The diester may be prepared by adding the $C_1$ to $C_3$ alkanol, the dicarboxylic acid, and water entrainer to a fractionating column. The water of reaction, entrainer and excess alcohol is removed overhead. The water may then be separated and the alcohol and entrainer may be used again. After removal of the excess alcohol, entrainer and water of reaction, the diester is then distilled over and any remaining higher boiling material is discarded. The distilled diester will then have an acidity of less than .1 mg. KOH/gram diester. The distilled diester, along with the higher alcohol, glycol, entrainer and catalyst may then be fed continuously to a second fractionator. The molar ratio of higher alcohol to the diester in this feed should be about 2:1. Although, the molar ratio of the diester to the glycol, will usually be about 2:1, such molar ratio may be slightly varied in order to obtain complex esters of the desired chain length. An azeotrope of the lower alcohol and entrainer is taken off as distillate from the fractionator while the crude complex ester is removed as bottoms. The azeotrope may be reused in manufacture of more diester. The crude ester may next be filtered in order to remove the catalyst, and then passed to a stripper where the complex ester is heated under vacuum while passing a stream of nitrogen through the complex ester in order to remove the last traces of entraining agent and other light ends.

The invention will be further understood by the following examples wherein several complex esters were prepared of the type:

Alcohol-dicarboxylic acid-(glycol-dicarboxylic acid)$_n$-alcohol

*Example I*

A still pot was charged with: 38.7 grams tetraethylene glycol, 100.0 grams diethyl sebacate, 50.4 grams of 2-ethyl hexanol, 100.0 ml. of toluene, and 0.2 gram of sodium methylate. This mixture was heated to a pot temperature of 135° C. under a 15-plate Oldershaw column, using a 20/1 reflux ratio. An ethyl alcohol-toluene binary azeotrope boiling at a temperature of 77.3° C. was removed overhead. The distillation was terminated after about 2 hours, when the temperature of the overhead had risen to 105° C. and the pot temperature was 150° C. 62 mls. of the azeotrope, weighing 51.5 grams, was recovered overhead. The remaining toluene was stripped off overhead under mild vacuum and the residue was contacted with 5 grams of F-20 $Al_2O_3$ and filtered through a Hyflo pre-coated funnel to remove the catalyst. The remaining product was then heated in a vacuum still to a pot temperature of 200° C. under 1 mm. Hg pressure. Nitrogen was then blown through the still for several minutes to remove the last traces of entrainer and light ends, then the heat was turned off and the residue was cooled. 150 grams of the complex ester product was recovered as residue, which was equivalent to 97.5% of the theoretical amount formed. The properties of the recovered complex ester and the desired properties were as follows:

|  | Product of Example I | Specification |
| --- | --- | --- |
| Kin. visc. at 210° F | 10.22 cs | 10.1 cs. min. |
| Kin. visc. at 100° F | 52.05 cs | 52.59 cs. |
| Viscosity index | 151 |  |
| Neut. number | 0.1 | 0.3 max. |
| Saponification number | 279.3 | 282 (theoretical). |

As seen from the above example, a complex ester was prepared which had a low neutralization number and required no further alkaline washing to reduce acidity. Furthermore, the saponification number of 279.3 was within experimental error of the theoretical neutralization number of 282. The actual saponification number indicates that a single complex ester product was formed, i.e. $n$ of the above formula was 1, rather than a mixture of complex esters and diesters as is obtained by prior methods. Also the product was water white.

*Example II*

A 2-liter distillation flask was charged with 99 g. (.5 mole) polyethylene glycol having a mol. wt. of 200; 214.3 g. (1.0 mole) diethyl norcamphorate (i.e., 1.3-dicarboethoxy cyclopentane); 168 g. (1.0 mole) Oxo decyl alcohol (a $C_{10}$ Oxo alcohol prepared by subjecting tripropylene to the Oxo process); 150 ml. of toluene and 0.2 g. of sodium methylate. The reaction mixture was heated with stirring under a 15-plate Oldershaw fractionating column using a 15/1 reflux ratio. There was taken overhead an ethyl alcohol-toluene azeotrope boiling between 75°–78° C. The residue, on cooling, was diluted with water, water washed, and then dried. The residue was then stripped of low-boiling materials by heating to a maximum pot temperature of 200° C. at a pressure of 1 mm. Hg for several minutes followed by cooling.

The properties of the finished complex ester were as follows:

Kin. visc. at:
    210° F _____ 8.14 cs.
    100° F _____ 44.10 cs.
    0° F _____ 1980 cs.
    −40° F _____ 54,319 cs.
    −65° F _____ 428 M.
ASTM cloud point _____ <−70° F.
ASTM pour point _____ −60° F.
Dean-Davis viscosity index _____ 146.
Color _____ Water-white.

While the invention is directed primarily to the preparation of glycol-centered complex esters, it is apparent that dicarboxylic acid-center complex esters may be prepared in a similar manner, by forming a diester of the glycol and a lower monocarboxylic acid, then reacting this diester with a dicarboxylic acid and a higher monocarboxylic acid and removing the liberated lower monocarboxylic acid.

What is claimed is:

1. A process for the preparation of synthetic ester lubricating oils of the general formula:

$$R_1\text{—OOCR}_2\text{COO—}(R_3\text{—OOCR}_4\text{COO})_x\text{—}R_5$$

wherein $R_1$ and $R_5$ are $C_5$ to $C_{12}$ alkyl radicals, $R_2$ and $R_4$ are hydrocarbon radicals free from non-aromatic unsaturation of a $C_4$ to $C_{12}$ dicarboxylic acid, $R_3$ is a glycol radical containing 2 to 20 carbon atoms and $x$ is 1 to 6; which comprises: reacting in the presence of an entraining agent, at a temperature not exceeding 200° C., and in about the molar proportions expressed in said Formula 1 a glycol, (2) a $C_5$ to $C_{12}$ alkanol, with (3) a diester of a $C_1$ to $C_3$ alkanol and a $C_4$ to $C_{12}$ dicarboxylic acid, and removing the alcohol formed during the reaction as an azeotrope with said entraining agent and at a temperature below the boiling point of said alkanol.

2. The process of claim 1 wherein the reaction is carried out in the presence of an alkaline catalyst.

3. The process of claim 1 wherein $x$ of said formula is 1.

4. A process according to claim 1, wherein said complex ester is finished by heating under a pressure of about 1 to 10 mm. Hg to a temperature of about 175° C. to 200° C. for a time sufficient to remove the final traces of entraining agent and other light ends.

5. A process according to claim 1, wherein said glycol is a polyethylene glycol, said alkanol is 2-ethyl hexanol, and said diester is diethyl sebacate.

6. A process according to claim 1, wherein said glycol is polyethylene glycol, said alkanol is an isomeric mixture of $C_{10}$ primary branched chain alcohols, and said diester is diethyl norcamphorate.

References Cited in the file of this patent

UNITED STATES PATENTS

| | | |
|---|---|---|
| 2,073,031 | Sly | Mar. 9, 1937 |
| 2,465,319 | Whinfield et al. | Mar. 22, 1949 |
| 2,780,644 | Ready | Feb. 5, 1957 |
| 2,785,194 | Hoare | Mar. 12, 1957 |

UNITED STATES PATENT OFFICE
CERTIFICATE OF CORRECTION

Patent No. 2,881,203                  April 7, 1959

Charles A. Cohen

It is hereby certified that error appears in the printed specification of the above numbered patent requiring correction and that the said Letters Patent should read as corrected below.

Column 2, line 24, the formula should appear as shown below instead of as in the patent:

$$R_1-OOCR_2COO-(R_3-OOCR_4COO)_x-R_5$$

column 5, lines 12 and 13, for "Formula 1 a glycol," read -- formula (1) a glycol, --.

Signed and sealed this 23rd day of August 1960.

(SEAL)
Attest:

KARL H. AXLINE
Attesting Officer

ROBERT C. WATSON
Commissioner of Patents